Patented Feb. 13, 1923.

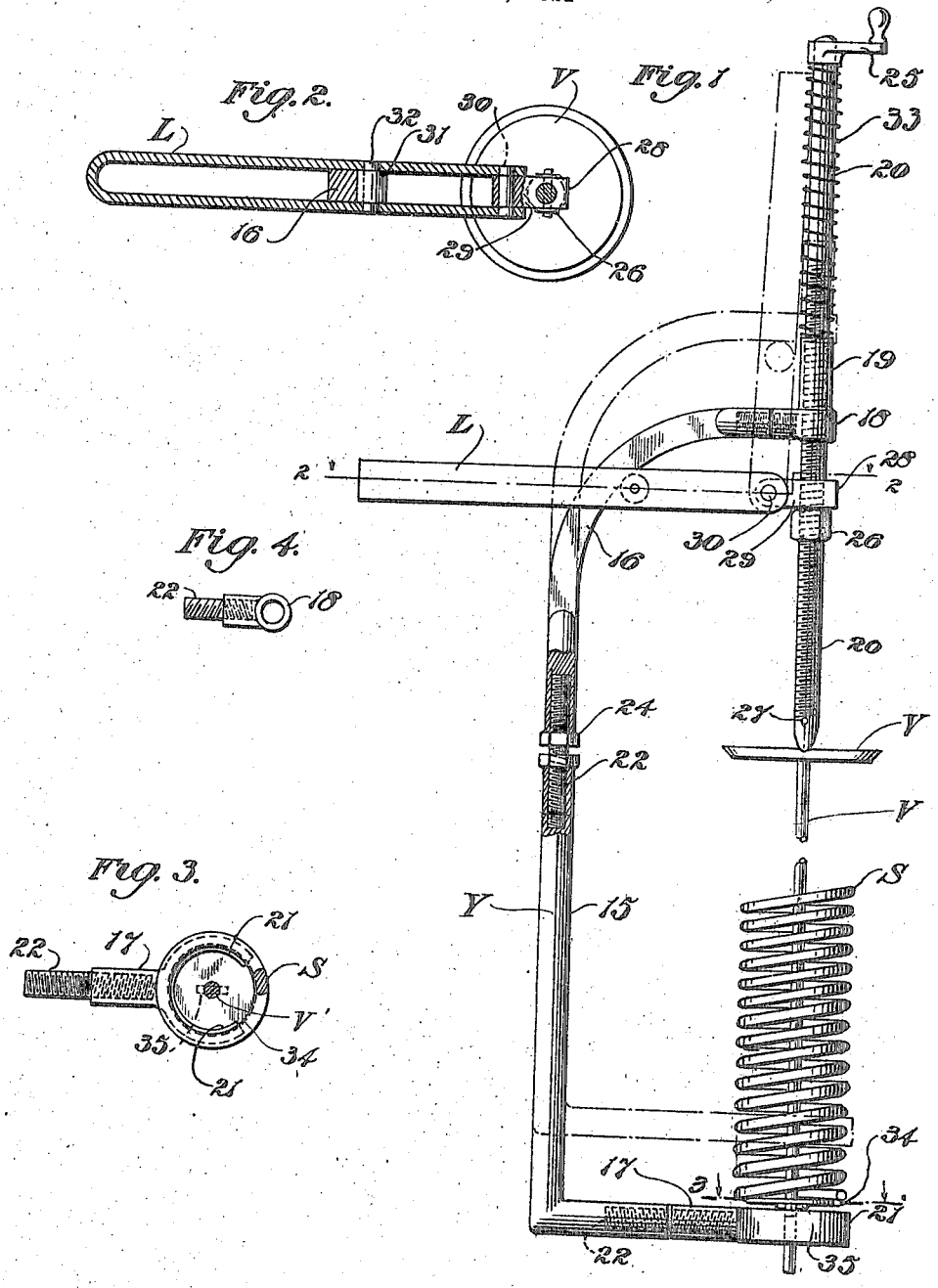

1,445,609

UNITED STATES PATENT OFFICE.

LOUIS H. BAYLER, OF LOS ANGELES, CALIFORNIA.

VALVE-SPRING LIFTER.

Application filed December 14, 1921. Serial No. 522,331.

*To all whom it may concern:*

Be it known that I, LOUIS H. BAYLER, a citizen of the United States, residing at Los Angeles, in the county of Los Angeles and State of California, have invented new and useful Improvements in Valve-Spring Lifters, of which the following is a specification.

My invention relates to tools for lifting the springs of valves for internal combustion engines, and a purpose of my invention is the provision of a tool of this character which operates to readily effect the compression of the valve spring by a direct pull with relation to the longitudinal axis of the valve thereby preventing distortion of the valve, and which, when in the active position, is temporarily locked so that the spring will remain compressed to allow both hands of the operator being employed in removing the spring retaining pin and spring.

It is also a purpose of my invention to provide a valve spring tool which is adjustable to permit of its application to engines of different construction and to accommodate extraneous apparatus situated on or adjacent to an engine so that such apparatus cannot defeat the successful operation of the tool, thus rendering the tool universally adaptable to all makes of engines.

I will describe one form of tool embodying my invention and will then point out the novel features thereof in claims.

In the accompanying drawings,

Figure 1 is a view showing in side elevation one form of tool embodying my invention, and in applied position with respect to a valve and valve spring.

Fig. 2 is a transverse sectional view taken on the line 2—2 of Fig. 1.

Fig. 3 is a transverse sectional view taken on the line 3—3 of Fig. 1.

Fig. 4 is a detail view showing in top plan the sleeve section of the yoke comprised in the tool shown in the preceding views.

Referring specifically to the drawings in which similar reference characters refer to similar parts, my invention, in its present embodiment, comprises a yoke designated generally at Y which is of substantially U-form and which consists of a right angular intermediate section 15 connected at one end to a curved track section 16, and at its opposite end to a terminal finger section 17. To the free end of the track section 16, a sleeve section 18 is connected and includes a sleeve 19 adapted to slidably receive a spindle 20. The free end of the terminal section 17 is provided with curved fingers 21 which, as shown in Fig. 3, are curved on the same arc. As clearly shown in Fig. 1, the confronting ends of all the sections of the yoke are tubular to threadedly receive the opposite ends of shanks 22 which are oppositely threaded to allow of an adjustment of one section with respect to the other. The shank connecting the sections 15 and 16 is provided with nuts 24 by means of which the sections can be locked in any adjusted position upon the shank.

From the foregoing construction it will be clear that the yoke Y as a unit can be adjusted to vary the distance between the sleeve 19 and the fingers 21, or widened to vary the horizontal position of the sleeve and fingers with relation to the sections 15 and 16.

As shown in Fig. 1, the spindle 20 is screw-threaded for a major portion of its length with its lower end tapered to engage within the usual recess of a valve V, while its upper end is provided with a crank 25 by means of which the spindle can be rotated. The threaded portion of the spindle 20 carries a nut 26 confined upon the spindle by means of a pin 27 and adjustable thereon to vary the position of a collar 28 loosely fitted on the spindle. This collar 28 is provided with a radial extension 29 upon which is fulcrumed at the point indicated at 30, one end of an operating lever L which, as shown in Fig. 2, is constructed from a single length of metal bent in the form of a U. The parallel portions of the lever are adapted to extend upon opposite sides of the track section 16 of the yoke as is clearly shown in Fig. 2, and a roller 31 is rotatably sustained upon a pin 32 mounted in the lever to have rolling contact with the inner edge of the track 16.

As shown in Fig. 1, a coiled expansible and relatively light spring 33 is mounted on the spindle between the crank 25 and the sleeve 19, this spring serving to normally elevate the spindle and to thus facilitate the application of the tool to a valve.

In the applied position of the tool with relation to the valve V and a valve spring S as shown in Fig. 1, the fingers 21 are adapted to surround the stem V' of the valve and to engage a washer 34. The lower end of the spindle 20 engages the head of the valve V directly above the stem V'. With the actuating lever L in horizontal position as shown in Fig. 1, movement of the lever to the dotted line position effects an elevation of the entire yoke Y with relation to the spindle 20, the pivot point 30 acting as a fulcrum for the lever, and the curved track 16 and roller 31 co-operating to effect such elevation of the yoke. With the yoke in elevated position, it will be clear that the fingers 21 are likewise elevated to effect a compression of the spring S and to thus allow removal of the spring retaining pin 35. It is to be particularly noted that when the lever reaches the inclined position shown in dash lines in Fig. 1, the downward pull exerted by the spring S will be ineffective to swing the lever downwardly past dead center so that the lever and consequently the yoke is maintained in elevated position without the necessity of holding the lever in such position. This obviously allows of the operator completely releasing the tool so that he can employ both hands in effecting a removal of the spring or valve.

By virtue of the control and adjustability of the yoke Y, it will be manifest that the tool can be readily applied to various forms of engines and that the yoke will extend around any extraneous apparatus situated on or adjacent to the engine, thus permitting of the proper positioning of the spindle 20 and the fingers 21 in effecting the lifting and compression of the valve spring. Through the adjustability of the nut 26 the throw of the lever can likewise be varied to permit of the application of the tool to springs of different tensions and lengths.

Although I have herein shown and described only one form of tool embodying my invention, it is to be understood that various changes and modifications may be made herein without departing from the spirit of the invention and the spirit and scope of the appended claims.

I claim as my invention:

1. A valve spring tool comprising a sectional yoke of substantially U-form, means for adjustably connecting the sections, fingers on one end of the yoke, a sleeve on the opposite end of the yoke and in vertical alinement with the fingers, a spindle slidably fitted in the sleeve, a collar movable on the spindle, a nut adjustable on the spindle for determining the position of said collar, and an operating lever fulcrumed on the collar and associated with said yoke to effect an elevation of the latter on said spindle when operated.

2. A valve spring tool comprising a sectional yoke of substantially U-form, means for adjustably connecting the sections, fingers on one end of the yoke, a sleeve on the opposite end of the yoke and in vertical alinement with the fingers, a spindle slidably fitted in the sleeve, a crank on the upper end of the spindle above the sleeve, an expansible spring surrounding the spindle between the crank and sleeve, a collar movable on the spindle, a nut adjustable on the spindle for determining the position of said collar, and an operating lever fulcrumed on the collar and associated with said yoke to effect an elevation of the latter on said spindle when operated.

3. A valve spring tool comprising a yoke including a track portion, a spindle slidably sustained on the yoke, fingers fixed to the yoke, and a lever adjustably fulcrumed on the spindle and associated with the yoke to effect an elevation of the latter on said spindle when operated.

4. A valve spring tool comprising a yoke including a curved track portion, a spindle slidably sustained on the yoke, a collar slidable on the spindle, a nut adjustable on the spindle to determine the position of said collar, a spring for urging the spindle upwardly within the yoke, a lever fulcrumed on the collar, and a roller carried by the lever and engageable with the track portion of said yoke for the purpose described.

In testimony whereof I have signed my name to this specification.

LOUIS H. BAYLER.